May 26, 1931.  E. G. WATROUS  1,806,962
PLUMBING FITTING
Filed May 31, 1929
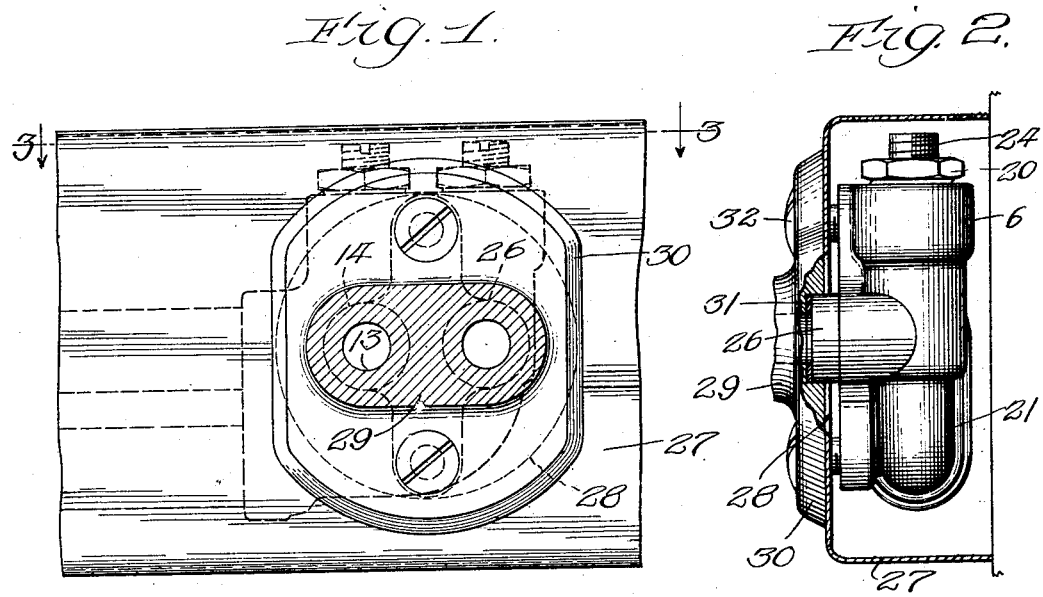
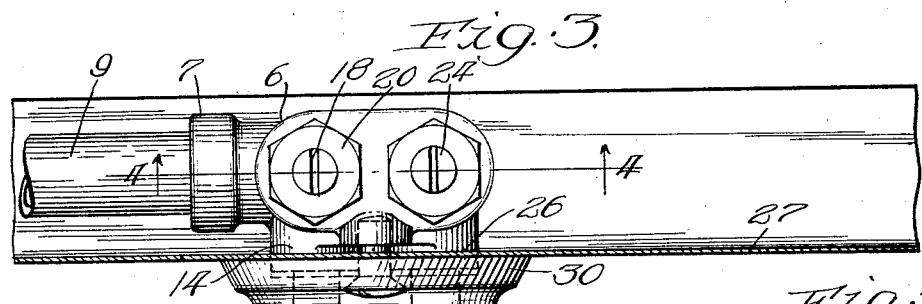
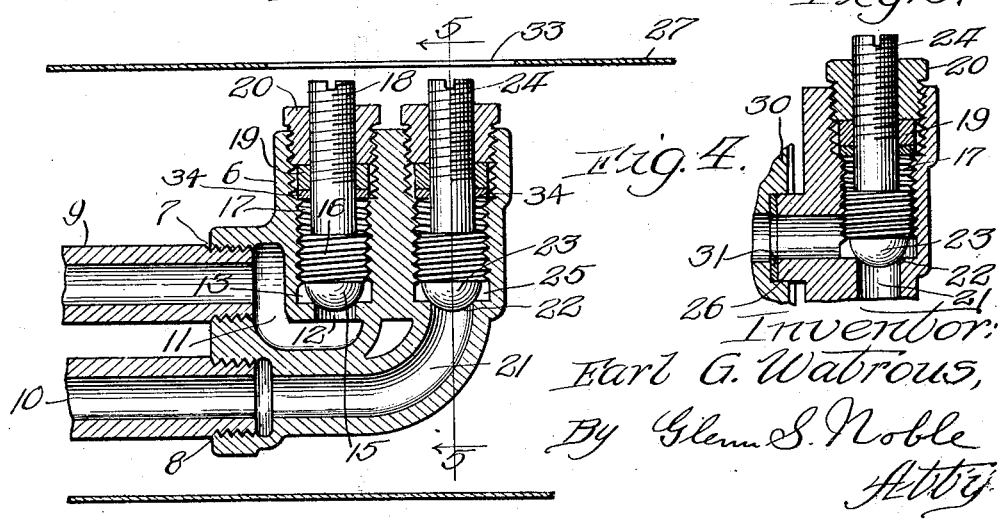
Inventor:
Earl G. Watrous,
By Glenn S. Noble
Atty Patented May 26, 1931

1,806,962

UNITED STATES PATENT OFFICE

EARL G. WATROUS, OF CHICAGO, ILLINOIS

PLUMBING FITTING

Application filed May 31, 1929. Serial No. 367,381.

This invention relates to fittings or devices for use in installing faucets or the like and in its preferred form comprises a coupling or L for connecting a water pipe or pipes with the faucet, a shut-off valve, and a support for the faucet.

The objects of this invention are to provide an improved plumbing fitting of the character indicated; to provide a fitting whereby the piping may be installed and the faucet connection shut off preparatory to mounting the faucets and the water may also be shut off from the faucets at any time for convenience in making repairs; to provide a multiple connection for connecting pipes to a faucet; to provide a combined connector and shut-off valve; to provide a pipe and faucet coupling which will support the faucet; and to provide such other advantages and improvements as will appear from the following description.

In the accompanying drawings illustrating this invention

Figure 1 is a front view of the enclosed fitting with a portion of the faucet shown in section;

Figure 2 is a side view with parts shown in section;

Figure 3 is a sectional plan view taken on the line 3—3 of Figure 1;

Figure 4 is a sectional view taken on the line 4—4 of Figure 3; and

Figure 5 is a sectional detail taken on the line 5—5 of Figure 4.

My improved fitting, as shown in these drawings, has a body 6 provided with threaded intake openings 7 and 8 for hot and cold water supply pipes 9 and 10. The inlet 7 leads to a chamber 11 having an outlet provided with a valve seat 12. This outlet leads to a passageway 13 which extends forwardly through a nipple or projection 14 at the front of the fitting. A valve 15 coacts with the valve seat 12 and serves to open and close this passageway. This valve has a threaded portion 16 which engages with a correspondingly threaded hole 17 in the body 6 and has an upwardly extending stem 18 which is slotted for receiving a screw driver or which may be turned by any suitable handle (not shown) or tool. The valve stem is provided with a packing 19 and packing gland or nut 20, and bottom retaining washer 34.

The inlet opening 8 communicates with a chamber 21 in the fitting which terminates in a valve seat 22 which is controlled by a valve 23 provided with an upwardly extending stem 24, this valve being mounted the same as the one just described. The chamber 21 opens into the passageway 25 which terminates in a forwardly extending projection or nipple 26 as shown particularly in Figures 4 and 5.

This fitting is particularly adapted for use in connection with faucets for swinging lavatory bowls where it is desired to cover the supply pipes, which is done by means of a channel shaped sheet metal cover or casing 27. The front wall of this cover is provided with a hole 28 through which the nipples or projections 14 and 26 extend. The faucet 29 which may be of any ordinary or preferred construction has a base or cover plate 30 which covers the hole 28 and rests against the front of the cover 27. Gaskets 31 are interposed between the nipples 14 and 26 and the respective openings in the faucet to make tight joints between the faucet and the fitting. The faucet is held in position and drawn tightly against the gaskets by means of screws 32 which project through the opening 28 of the cover and engage with threaded holes in the body 6 of the fitting, as shown particularly in Figure 2. The channel or cover 27 is also provided with a hole 33 above the valve stems 18 and 24 to permit ready access to the same.

By means of my improved fitting all of the faucet piping and connections may be installed and the water system tested before attaching the faucets. The faucets may then be applied as described and the shut-off valves opened to permit the water to pass into the same preparatory for use.

My improved connection may be made in various sizes and the outlets may be positioned in different ways to accommodate different conditions; therefore I do not wish to limit my patent rights to the exact form herein shown and described, except as specified in the following claims in which I claim:

1. A new article of manufacture comprising a combined shut-off valve and faucet support having a plurality of passageways therethrough, and valves for controlling said passageways.

2. A new article of manufacture comprising a connection for connecting a plurality of pipes to a faucet, valves for controlling the passageways through the connection, and means for supporting a faucet on the connection.

3. The combination of a body having an inlet opening communicating with a passageway through the body terminating in a nipple, a valve for controlling the passageway, said body also having a second inlet opening communicating with a second passageway through the body which also terminates in a nipple, a valve for controlling the second passageway, a faucet having inlet openings adapted to register with the openings through the nipples, and means for securing the faucet to the body.

4. The combination of a body having an inlet opening, a pipe connected with said opening, said body having a chamber into which the opening leads, a passageway from the chamber leading to an outlet projection, a valve for controlling the outlet from the chamber, said body also having a second inlet opening, a pipe connected with said opening, a chamber communicating with the second opening, an outlet passageway from the second chamber to a projection adjacent to the first named projection, a valve for controlling the outlet from the second chamber, a faucet having inlet openings which register with the openings through said projections, gaskets interposed between the projections and the faucet, and screws for fastening the faucet to the body.

5. The combination with a pair of supply pipes, of a combined shut-off valve and faucet support, a casing covering the pipes and support and having an opening therethrough, a faucet having a base plate engaging with the casing, and means for securing the faucet to the valve body, communication between the valve body and faucet being arranged through the opening in the casing.

6. In a faucet installation, the combination of supply pipes, a combined shut-off valve and connector engaging with said pipes, a casing over the pipes and connector, and means for mounting the faucet on the connector and establishing communication therewith through the casing.

EARL G. WATROUS.